(12) United States Patent
Chung et al.

(10) Patent No.: US 8,995,843 B2
(45) Date of Patent: Mar. 31, 2015

(54) MULTICARRIER BASED OPTICAL SIGNAL TRANSMITTING APPARATUS AND OPTICAL SIGNAL RECEIVING APPARATUS

(75) Inventors: Hwan Seok Chung, Daejeon (KR); Sun Hyok Chang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 221 days.

(21) Appl. No.: 13/609,908

(22) Filed: Sep. 11, 2012

(65) Prior Publication Data
US 2013/0163992 A1 Jun. 27, 2013

(30) Foreign Application Priority Data
Dec. 23, 2011 (KR) .......................... 10-2011-0141237

(51) Int. Cl.
*H04B 10/12* (2006.01)
*H04J 14/02* (2006.01)

(52) U.S. Cl.
CPC ........... *H04J 14/026* (2013.01); *H04J 14/0224* (2013.01)
USPC .................................. 398/183; 398/76; 398/79

(58) Field of Classification Search
CPC ............... H04B 10/504; H04B 10/548; H04B 10/5165; H04J 14/0224
USPC .................................. 398/69, 76, 79, 183, 187
See application file for complete search history.

(56) References Cited

U.S. PATENT DOCUMENTS

| 6,917,031 | B1 | 7/2005 | Sun et al. | |
|---|---|---|---|---|
| 8,437,638 | B2* | 5/2013 | Kobayashi et al. | 398/90 |
| 2006/0171722 | A1* | 8/2006 | Toliver | 398/188 |
| 2011/0069975 | A1* | 3/2011 | Liu et al. | 398/202 |
| 2011/0170873 | A1* | 7/2011 | Liu et al. | 398/82 |
| 2012/0224866 | A1* | 9/2012 | Gaete et al. | 398/186 |
| 2013/0088765 | A1* | 4/2013 | Duthel et al. | 359/259 |

FOREIGN PATENT DOCUMENTS

EP 2051414 A1 4/2009

* cited by examiner

*Primary Examiner* — Dzung Tran
(74) *Attorney, Agent, or Firm* — Nelson Mullins Riley & Scarborough LLP; Anthony A. Laurentano, Esq; Lewis Lee, Esq.

(57) ABSTRACT

Disclosed is an optical signal transmitting apparatus including: an optical carrier generator configured to generate a plurality of optical carriers and outputs the optical carriers to optical modulators corresponding to the optical carriers, respectively; a plurality of optical modulators configured to modulate the optical carriers, respectively, according to an input signal; and an optical combiner configured to couple a plurality of optical signals from the plurality of optical modulators.

7 Claims, 6 Drawing Sheets

FIG. 1A

FIXED FREQUENCY GRID(Fixed Grid)

FIG. 1B

FLEXIBLE FREQUENCY GRID(Flex Grid)

FIXED FREQUENCY GRID OPERATION

FIG. 4B

FLEXIBLE FREQUENCY GRID OPERATION

MULTICARRIER BASED OPTICAL SIGNAL TRANSMITTING APPARATUS AND OPTICAL SIGNAL RECEIVING APPARATUS

CROSS-REFERENCE TO RELATED APPLICATIONS

This application claims priority to and the benefit of Korean Patent Application No. 10-2011-0141237 filed in the Korean Intellectual Property Office on Dec. 23, 2011, the entire contents of which are incorporated herein by reference.

TECHNICAL FIELD

The present invention relates to an optical signal transmitting apparatus and an optical signal receiving apparatus, and more particularly, to a multicarrier based optical signal transmitting apparatus which transmits high-speed signals by using several optical carriers, and a multicarrier based optical signal receiving apparatus.

BACKGROUND ART

In recent years, the amounts of traffics generated in networks are continuously increasing due to popularization of smart phones, high-resolution TVs and the like, and transmission speeds for channels of optical transmission networks are expected to increase up to 400 Gb/s or 1 Tb/s, exceeding 100 Gb/s. A non-return-to-zero (NRZ) method where only existing magnitudes are turned on and off through a modulation method of generating high-speed signals and transmitting the high-speed signals through optical links has a limit due to a limit in bandwidths of devices and high optical signal-to-noise ratio (OSNR) requirements. Thus, a quaternary phase shift keying (QPSK) method where the number of symbols transmitted per bit is increased while modulating the phase of an optical signal or a quadrature amplitude modulation (QAM) method where the magnitude and phase of an optical signal are simultaneously modulated are being introduced.

As a transmission speed of an optical signal increases or the number of bits transmitted per symbol increases, a higher optical signal-to-noise ratio (OSNR) is required. In general, since OSNR becomes lower as a distance from an optical transmission line is longer, a signal having a high transmission speed and having a large number of bits transmitted per symbol has a short maximum transmission distance by which the signal can be transmitted.

Figure 1A:
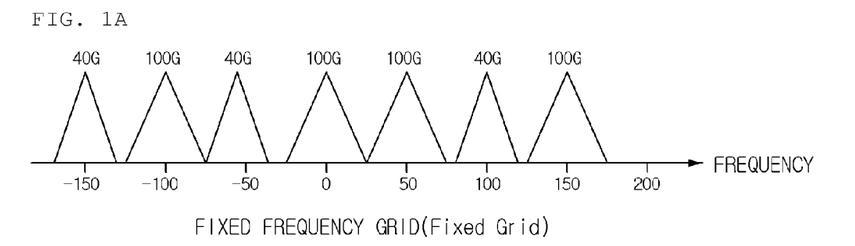
FIG. 1A illustrates transmission spectrums of a fixed frequency grid.
Figure 1B:
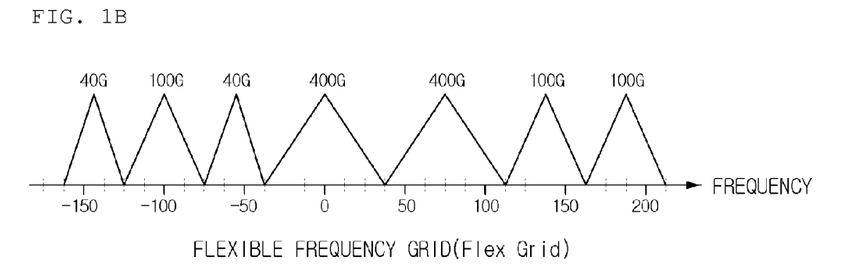
FIG. 1B illustrates transmission spectrums of a flexible frequency grid.

In general, an optical transmitter is tuned to a fixed frequency defined by ITU-T Standards, and an interval between frequencies is 50 GHz as illustrated in FIG. 1A (Fixed frequency grid). However, if a transmission speed per one channel of an optical signal reaches 400 Gb/s, exceeding 100 Gb/s, the signal cannot be accommodated in the fixed frequency interval defined by ITU-T Standards. It is because a bandwidth occupied by a signal becomes larger than 50 GHz due to a high transmission speed and thus an interference with a neighboring channel may occur. In order to avoid such an interference, a method where a guard band is present between a neighboring channel and a 400 Gb/s signal may be used but spectral efficiency is reduced. Thus, a flexible frequency grid where an interval of frequency grids is subdivided into 12.5 GHz to accommodate a 400 Gb/s signal in an optical transmission network and prevents waste of frequencies is being introduced as a new method. FIG. 1B illustrates transmission spectrums of a flexible frequency grid. In the flexible frequency grid, a wavelength of an optical transmitter is located at arbitrary frequencies disposed at an interval of 12.5 GHz and an occupied bandwidth is determined according to the number of slots having a frequency interval of 12.5 GHz. Although a flexible frequency grid for freely changing a center frequency and a bandwidth of an optical signal is required to accommodate a 400 Gb/s optical signal together with an existing 40 Gb/s or 100 Gb/s optical signal in an optical transmission network, a 400 Gb/s cannot be accommodated in an existing fixed frequency grid.

SUMMARY OF THE INVENTION

The present invention has been made in an effort to provide an optical signal transmitting apparatus and an optical signal receiving apparatus where a high-speed optical signal can be accommodated in both a fixed frequency grid mode and a flexible frequency grid mode, and a long-distance transmission of a high-speed signal can be achieved by lessening the requirements of an optical signal to noise ratio.

An exemplary embodiment of the present invention provides an optical signal transmitting apparatus including: an optical carrier generator configured to generate a plurality of optical carriers and outputs the optical carriers to optical modulators corresponding to the optical carriers, respectively; a plurality of optical modulators configured to modulate the optical carriers, respectively, according to an input signal; and an optical combiner configured to couple a plurality of optical signals from the plurality of optical modulators.

Center frequencies and frequency intervals of the plurality of optical carriers may be variable.

The optical carrier generator may include: a multicarrier generator configured to generate the plurality of optical carriers; and a carrier separator configured to separate the plurality of optical carriers and outputs the optical carriers to the optical modulators corresponding to the optical carriers, respectively.

The multicarrier generator may include: a laser generator configured to generate a laser; and a modulator configured to modulate the laser to a sine wave. Here, the optical carrier generator adjusts a wavelength of the laser and a frequency of the sine wave to vary the center frequencies and frequency intervals of the plurality of optical carriers.

The optical carrier generator may further include: a plurality of laser generators configured to generate a plurality of lasers corresponding to the plurality of optical carriers, respectively. Here, the optical carrier generator may adjust wavelengths of the plurality of lasers, respectively, to vary the center frequencies and frequency intervals of the plurality of optical carriers.

The frequency intervals of the plurality of optical carriers may be integer times as large as 50 GHz or integer times as large as 12.5 GHz.

The optical signal transmitting apparatus may further include: a controller configured to set center frequencies and frequency intervals of the plurality of optical carriers.

Another exemplary embodiment of the present invention provides an optical signal receiving apparatus including: a signal separator configured to separate input optical signals for a plurality of optical carriers, respectively, and output the optical signals to demodulators corresponding to the optical signals, respectively; and a plurality of demodulators configured to restore original signals from the optical signals, respectively.

Center frequencies and frequency intervals of the plurality of optical carriers may be variable.

The signal separator may include: a coupler configured to branch the input optical signals; a plurality of laser generators configured to generate a plurality of lasers corresponding to the plurality of optical carriers, respectively; and a plurality of optical hybrid units configured to receive the optical signals output from the coupler and the lasers from the plurality of laser generators and generate an inphase signal and a quadrature signal.

The signal separator may adjust the wavelengths of the plurality of lasers and separates the input optical signals for the plurality of optical carriers whose center frequencies and frequency intervals are variable.

The frequency intervals of the plurality of optical carriers may be integer times as large as 50 GHz or integer times as large as 12.5 GHz.

The optical signal receiving apparatus may further include a controller configured to set center frequencies and frequency intervals of the plurality of optical carriers.

According to the present invention, a high-speed optical signal can be accommodated in both a fixed frequency grid mode and a flexible frequency grid mode, and a long-distance transmission of a high-speed signal can be achieved by lessening the requirements of an optical signal to noise ratio.

The foregoing summary is illustrative only and is not intended to be in any way limiting. In addition to the illustrative aspects, embodiments, and features described above, further aspects, embodiments, and features will become apparent by reference to the drawings and the following detailed description.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First of all, we should note that in giving reference numerals to elements of each drawing, like reference numerals refer to like elements even though like elements are shown in different drawings. In describing the present invention, well-known functions or constructions will not be described in detail since they may unnecessarily obscure the understanding of the present invention. It should be understood that although exemplary embodiment of the present invention are described hereafter, the spirit of the present invention is not limited thereto and may be changed and modified in various ways by those skilled in the art.

Figure 2:
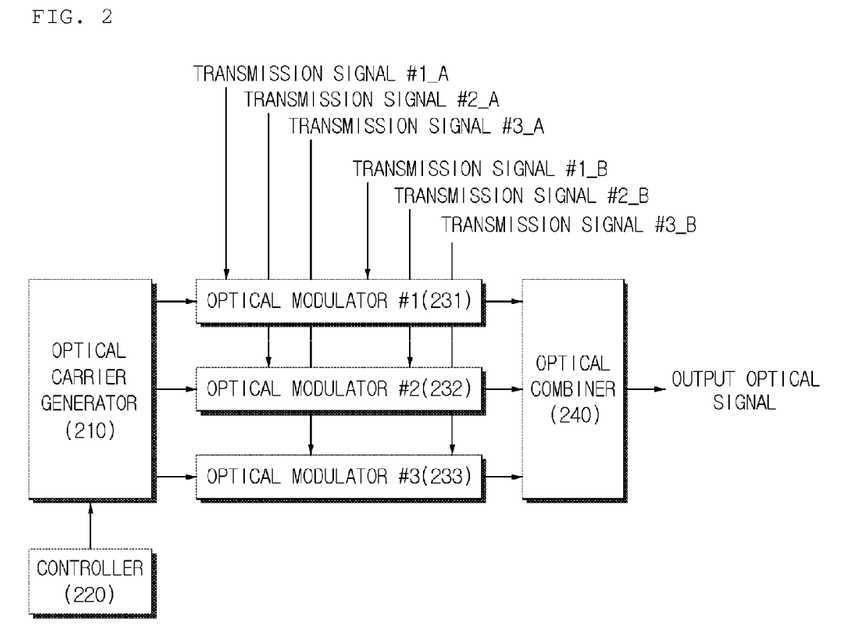
FIG. 2 illustrates an optical signal transmitting apparatus according to an exemplary embodiment of the present invention.

FIG. 2 illustrates an optical signal transmitting apparatus according to an exemplary embodiment of the present invention. The optical signal transmitting apparatus according to the present exemplary embodiment includes an optical carrier generator 210, a controller 220, a plurality of optical modulators 231, 232 and 233, and an optical combiner 240.

The optical carrier generator 210 generates a plurality of optical carriers and outputs the optical carriers to the optical modulators 231, 232 and 233 corresponding to the optical carriers, respectively. The optical modulators 231, 232 and 233 modulate the optical carriers according to an input signal and outputs the optical signals to the optical combiner 240. The optical modulators 231, 232 and 233 may modulate phases or magnitudes of the optical carriers or modulate the phases and magnitudes of the optical carriers simultaneously. QPSK and QAM may be used for the modulation method and polarization multiplexing may be used as well. The optical combiner 240 couples the input optical signals to output the coupled optical signals to an optical transmission line, in order to apply the modulated signals to one optical fiber. The optical combiner 240 may be an optical coupler.

In FIG. 2, the number of optical carriers generated by the optical carrier generator 210 is 3 and the number of the optical modulators corresponding to the optical carriers is also 3. However, it is apparent that the number of the optical carriers and the optical modulators may be an arbitrary number equal to or larger than 2.

Figure 3A:
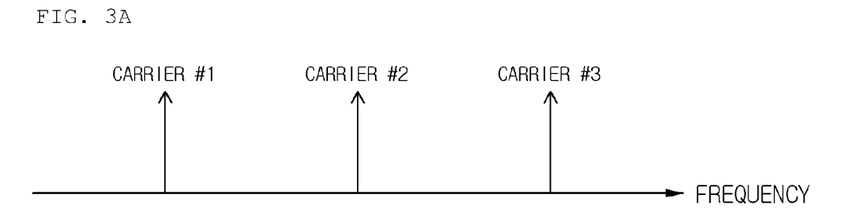
FIG. 3A illustrates examples of carriers generated by the optical carrier generator 210.

FIG. 3A illustrates examples of carriers generated by the optical carrier generator 210. If the carriers generated by the optical carrier generator 210 is Carrier #1, Carrier #2 and Carrier #3, Carrier #1, Carrier #2 and Carrier #3 are input to Optical modulator #1 231, Optical modulator #2 232 and Optical modulator #3 233, respectively.

Figure 3B:
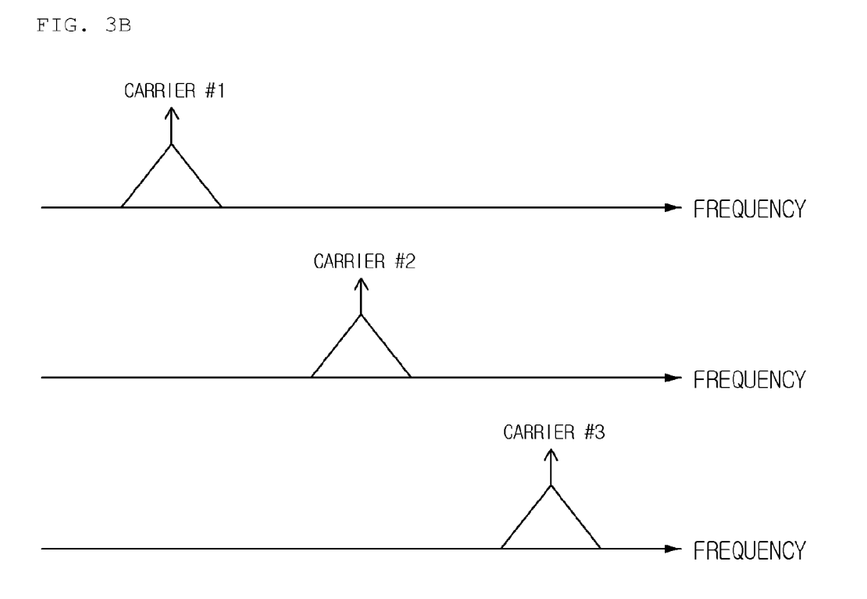
FIG. 3B illustrates examples of optical signals output from the optical modulators 231, 232 and 233, respectively.

Optical modulator #1 231, Optical modulator #2 232 and Optical modulator #3 233 are input electrical signals, respectively, and Transmission signal #1_a, Transmission signal #1_b, Transmission signal #2_a, Transmission signal #2_b, and Transmission signal #3_a, Transmission signal #3_b are input. Optical modulator #1 231, Optical modulator #2 232 and optical modulator #3 233 modulate Carrier #1, Carrier #2 and Carrier #3 with the corresponding input signals, respectively to output the modulated carriers. FIG. 3B illustrates examples of optical signals output from the optical modulators 231, 232 and 233, respectively.

Figure 3C:
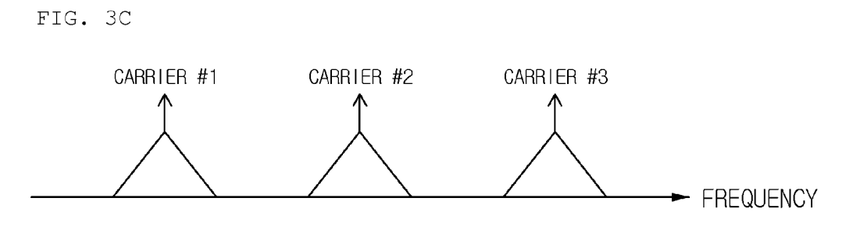
FIG. 3C illustrates examples of optical signals output from the optical combiner 240.

The optical combiner 240 couples the optical signals output from the optical modulators 231, 232 and 233, respectively, to output the coupled optical signals to the optical transmission line. FIG. 3C illustrates examples of optical signals output from the optical combiner 240.

If a high-speed signal is transmitted by using several (N) carriers, an optical signal to noise ratio is desirably decreased to 1/N as compared with a case where one carrier is used.

In the exemplary embodiment of the present invention, the optical carrier generator 210 varies and outputs center frequencies and frequency intervals of the plurality of optical carriers under the control of the controller 220. The setting of the center frequencies and frequency intervals of the optical carriers and the number of optical carriers may be stored in the controller 220 in advance, be input from a user, or be received from the outside. According to the setting, the controller 220 applies a control signal for designating the center frequencies (or center wavelengths) and frequency intervals of the optical carriers and the number of the optical carriers to the optical carrier generator 210. The optical carrier generator 210 varies the center frequencies and frequency intervals of the optical carriers in response to the control signal.

Figure 4A:
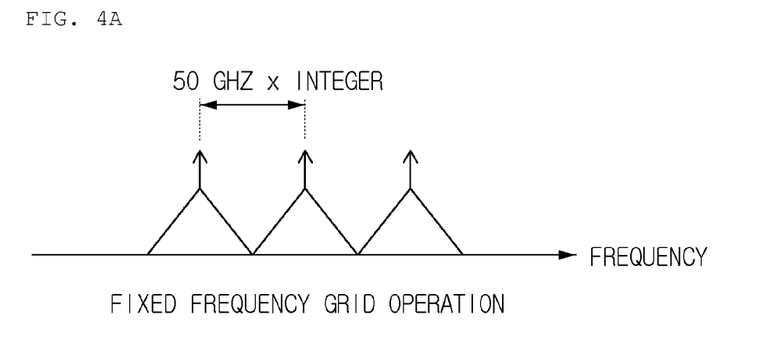
FIG. 4A and FIG. 4B illustrate examples of spectrums of output optical signals of the optical combiner 240 in the fixed frequency grid mode and the flexible frequency grid mode, respectively.
Figure 4B:
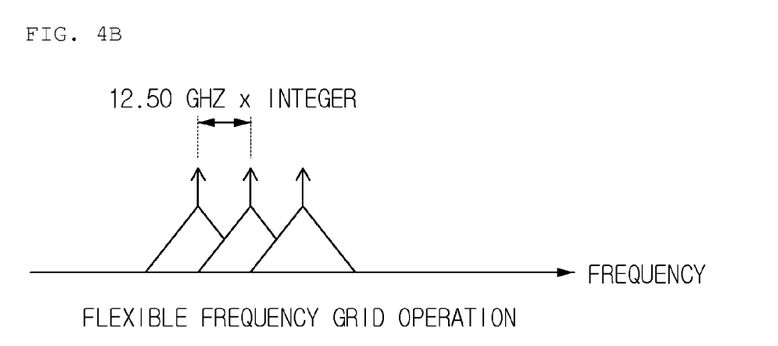

The control mode of the controller 220 may include a fixed frequency grid mode and a flexible frequency grid mode. In the fixed frequency grid mode, the controller 220 sets the optical carrier generator 210 such that the plurality of optical carriers are located at fixed frequencies defined by ITU-T Standards and at frequency intervals integer times as large as 50 GHz. In the flexible frequency grid mode, the controller 220 sets the optical carrier generator 210 such that the plurality of optical carriers are located at flexible center frequencies at frequency intervals integer times as larger as 12.5 GHz. FIG. 4A and FIG. 4B illustrate examples of spectrums of output optical signals of the optical combiner 240 in the fixed frequency grid mode and the flexible frequency grid mode, respectively.

A high-speed optical signal can be accommodated in the existing fixed frequency grid mode and in the flexible frequency grid mode where spectrum efficiency is excellent as well, by flexibly operating the center frequencies and frequency intervals of the optical carriers.

Figure 5:
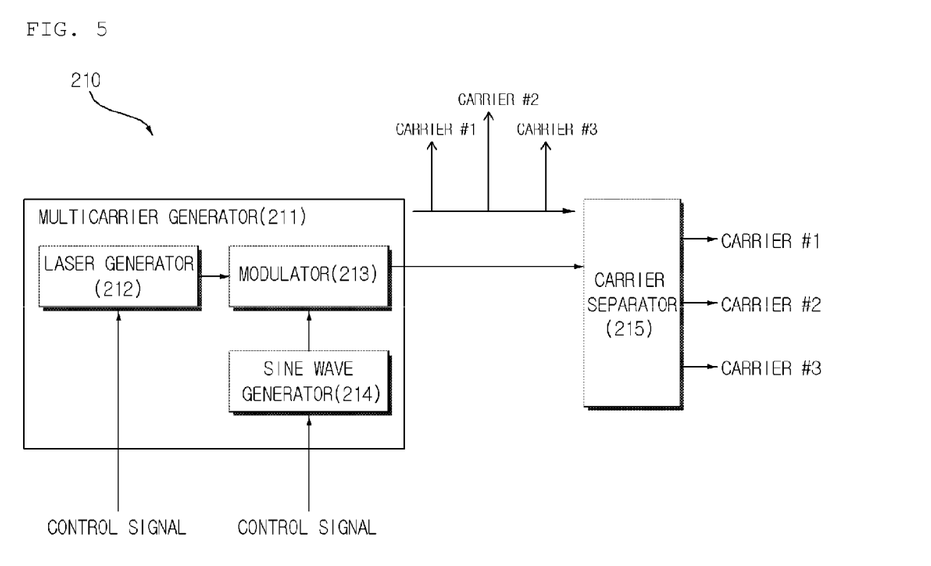
FIG. 5 illustrates an example of a detailed configuration of an optical carrier generator 210.

FIG. 5 illustrates an example of a detailed configuration of an optical carrier generator 210. Referring to FIG. 5, the optical carrier generator 210 includes a multicarrier generator 211 for generating a multicarrier signal having a plurality of optical carriers, and a carrier separator 215 for separating the plurality of optical carriers and outputting the separated optical carriers to the optical modulators 231, 232 and 233 corresponding to the optical carriers, respectively. The multicarrier generator 211 includes a laser generator 212 for generating a laser having a predetermined wavelength, a sine wave generator 214 for generating a sine wave having a predetermined frequency, and a modulator 213 for modulating the laser with the sine wave and generating a plurality of optical carriers together. If necessary, the multicarrier generator 211 may further include an optical filter and an optical amplifier. The laser generator 212 may generate a general wavelength variable laser.

If a frequency corresponding to the wavelength of the laser is f0 and the frequency of the sine wave is f1, optical carriers having frequencies of . . . , $f_0-2f_1$, $f_0-f_1$, $f_0$, $f_0+f_1$, $f_0+2f_1$, . . . may be generated together through the modulator 213. In this case, the center frequencies and frequency intervals of the optical carriers may be varied by adjusting an output wavelength of the laser generator 212 and an frequency of the sine wave generator 214. The laser generator 212 and the sine wave generator 214 can adjust an output wavelength and a sine wave frequency in response to a control signal from the controller 220.

Referring to FIG. 5, the multicarrier generator 211 outputs a multicarrier signal including Carrier #1, Carrier #2 and Carrier #3 to the carrier separator 215, and the carrier separator 215 separates the multicarrier signal, and outputs Carrier #1, Carrier #2 and Carrier #3 to Optical modulator #1 231, Optical modulator #2 232 and Optical modulator #3 233, respectively.

Figure 6:
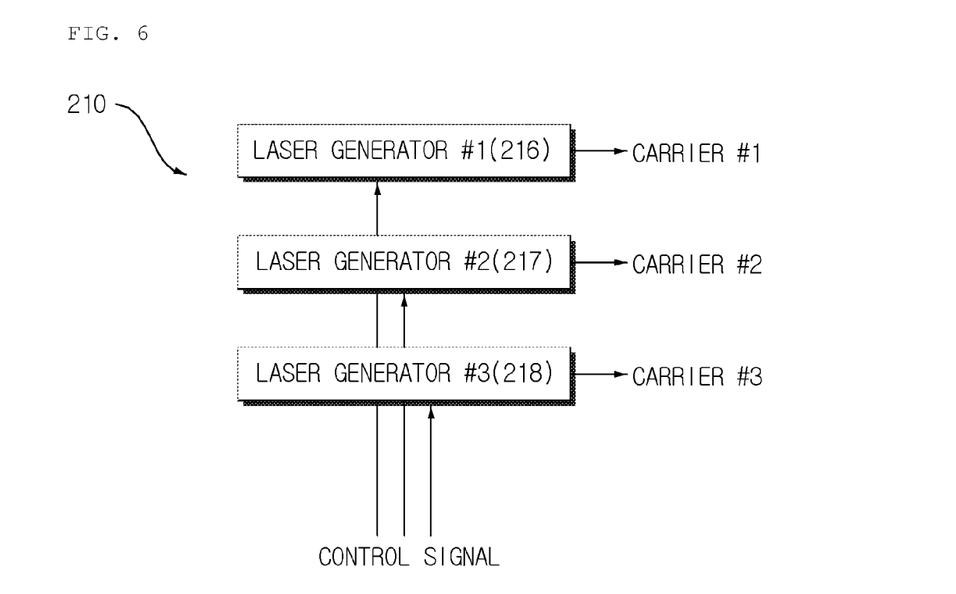
FIG. 6 illustrates another example of a detailed configuration of an optical carrier generator 210.

FIG. 6 illustrates another example of a detailed configuration of an optical carrier generator 210. Referring to FIG. 6, the optical carrier generator 210 includes a plurality of laser generators 216, 217 and 218 for generating lasers having predetermined wavelengths, respectively. The laser generators 216, 217 and 218 may generate general wavelength variable lasers. The wavelengths of the laser generators 216, 217 and 218 correspond to the frequencies of the optical carriers, respectively. Referring to FIG. 6, Laser generator #1 216, Laser generator #2 217 and Laser generator #3 218 generate Carrier #1, Carrier #2 and Carrier #3, respectively, and outputs the carriers to Optical modulator #1 231, Optical modulator #2 232 and Optical modulator #3 233, respectively. The laser generators 216, 217 and 218 can adjust the output wavelengths, respectively to vary the center frequencies and frequency intervals of the optical carriers. The laser generators 216, 217 and 218 can adjust output wavelengths in response to a control signal from the controller 220.

Figure 7:
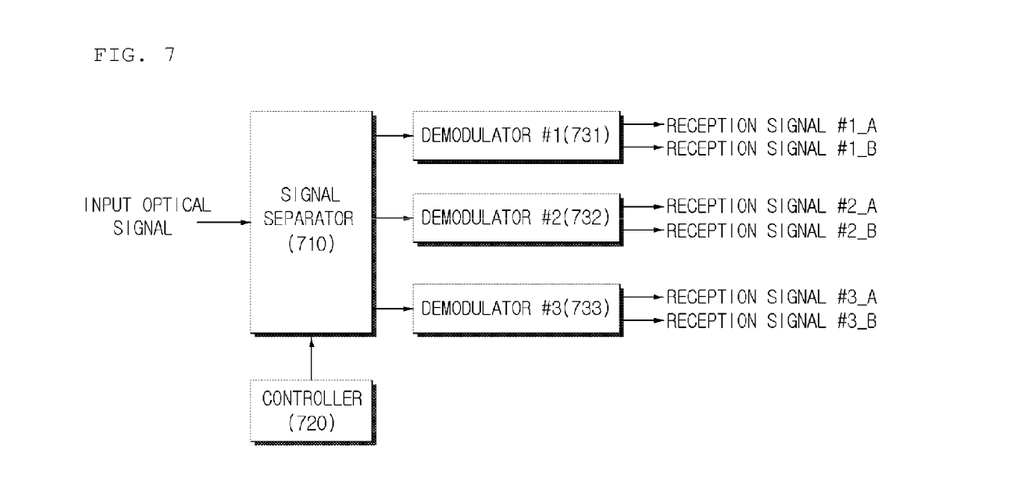
FIG. 7 illustrates an optical signal receiving apparatus according to an exemplary embodiment of the present invention.

FIG. 7 illustrates an optical signal receiving apparatus according to an exemplary embodiment of the present invention. The optical signal receiving apparatus according to the present exemplary embodiment may be integrated with the optical signal transmitting apparatus illustrated in FIG. 2 to be realized, in which case the optical signal transmitting/receiving apparatus according to an exemplary embodiment of the present invention is realized. The optical signal receiving apparatus according to the present exemplary embodiment includes a signal separator 710, a controller 720, and a plurality of demodulators 731, 732 and 733.

Figure 8A:
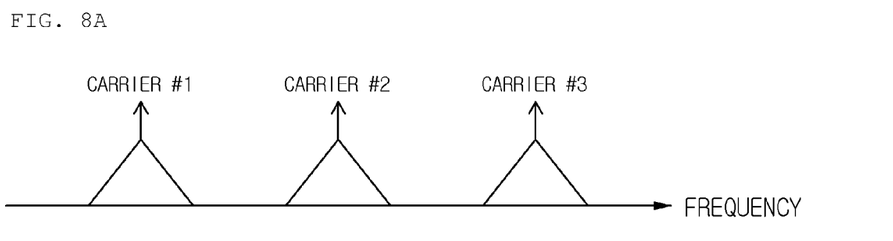
FIG. 8A is an example of an input optical signal, which is a signal where the optical signals obtained by modulating Carrier #1, Carrier #2 and Carrier #3 are combined.
Figure 8B:
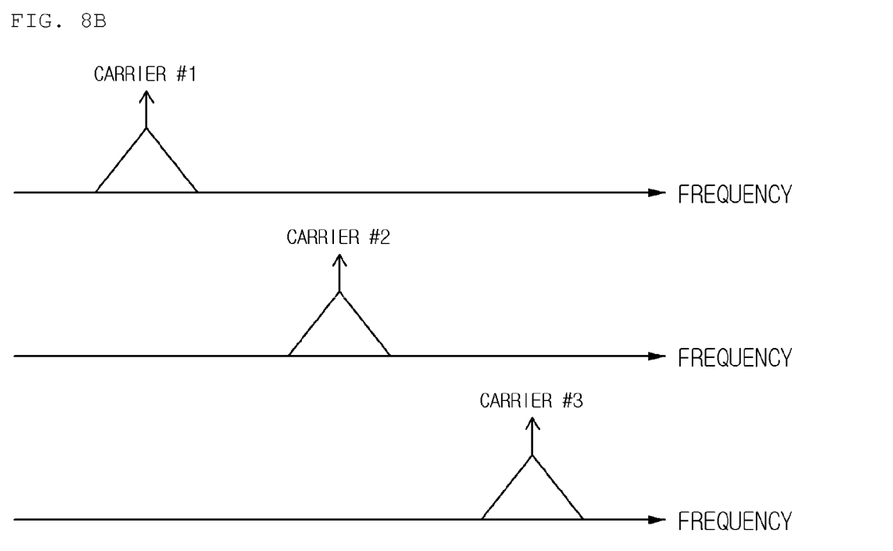
FIG. 8B illustrates examples of optical signals output from the signal separator 710.

The signal separator 710 separates the optical signals input from the optical transmission line for the plurality of optical carriers, and outputs the optical signals to the demodulators 731, 732 and 733 corresponding to the optical signals, respectively. The input optical signal is a signal where the optical signals modulated with the plurality of optical carriers are combined. FIG. 8A is an example of an input optical signal, which is a signal where the optical signals obtained by modulating Carrier #1, Carrier #2 and Carrier #3 are combined. FIG. 8B illustrates examples of optical signals output from the signal separator 710. The optical signal corresponding to Carrier #1 is input to Demodulator #1 731, the optical signal corresponding to Carrier #2 is input to Demodulator #2 732, and the optical signal corresponding to Carrier #3 is input to Demodulator #3 733. The demodulators 731, 732 and 733 restore the original signals from the input optical signals, that is, the optical signals whose phases or magnitudes, or phases and magnitudes are modulated to output the original signals as electrical signals. The demodulation method also includes QPSK and QAM, and corresponds to the modulation method of the signal transmitting side.

In FIG. 7, the number of the optical carriers and the number of the demodulators are 3. However, it is apparent that the number of optical carriers and demodulators may be an arbitrary number equal to or larger than 2.

Demodulator #1 731, Demodulator #2 732 and Demodulator #3 733 restore Reception signal #1_a, Reception signal #1_b, Reception signal #2_a, Reception signal #2_b, and Reception signal #3_a, Reception signal #3_b from the input optical signals, respectively.

If a high-speed signal is received by using several (N) carriers, an optical signal to noise ratio is desirably decreased to 1/N as compared with a case where one carrier is used.

In the exemplary embodiment of the present invention, the signal separator 710 separates the input optical signals for the optical carriers according to the center frequencies and frequency intervals of the optical carriers and the number of optical carriers under the control of the controller 720. The setup of the center frequencies and frequency intervals of the optical carriers and the number of optical carriers may be stored in the controller 720 in advance, be input from a user, or be received from the outside. According to the setting, the controller 720 applies a control signal for designating the center frequencies (or center wavelengths) and frequency intervals of the optical carriers and the number of the optical carriers to the signal separator 710. The signal separator 710 separates the input optical signals for the optical carriers in response to the control signal.

Like in the above-described optical signal transmitting apparatus, the control mode of the controller 720 may include a fixed frequency grid mode and a flexible frequency grid mode. In the fixed frequency grid mode, the controller 720 sets the signal separator 710 such that the input optical signals are separated for the optical carriers located at fixed frequencies defined by ITU-T Standards and at frequency intervals integer times as large as 50 GHz. In the flexible frequency grid mode, the controller 720 sets the signal separator 710 such that the input optical signals are separated for the optical carriers located at variable center frequencies and at frequency intervals integer times as large as 12.5 GHz.

A high-speed optical signal can be accommodated in the existing fixed frequency grid mode and in the flexible frequency grid mode where spectrum efficiency is excellent as well, by flexibly operating the center frequencies and frequency intervals of the optical carriers.

Figure 9:
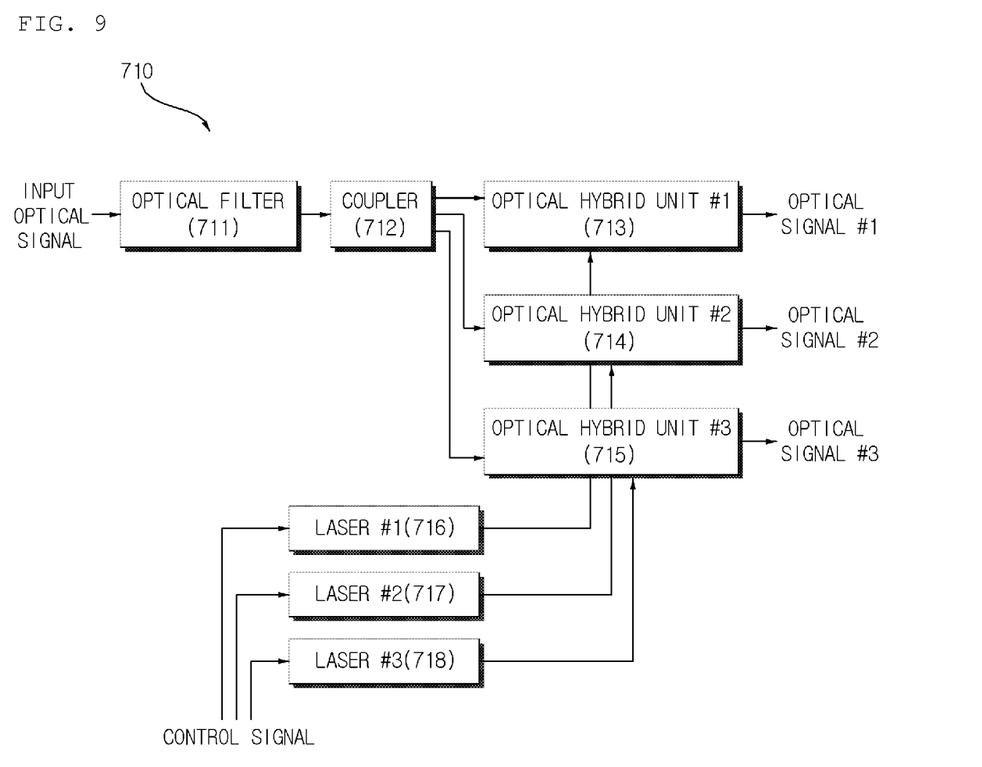
FIG. 9 illustrates an example of a detailed configuration of a signal separator 710.

FIG. 9 illustrates an example of a detailed configuration of a signal separator 710. Referring to FIG. 9, the signal separator 710 includes an optical filter 711, a coupler 712, a plurality of optical hybrid units 713, 714 and 715, a plurality of laser generators 716, 717 and 718.

The optical filter 711 removes noise except for signal components and signals of other channels from the input optical signals. The output of the optical filter 711 is input to the coupler 712.

The coupler 712 branches the optical signals from the optical filter 711, and outputs a plurality of optical signals. The optical signals output from the coupler 712 are input to the optical hybrid units 713, 714 and 715, respectively.

Meanwhile, the laser generators 716, 717 and 718 generate lasers having wavelengths corresponding to the center frequencies of the optical carriers, respectively. For example, Laser generator #1 716, Laser generator #2 717 and Laser generator #3 718 generate lasers having wavelengths the same as or similar to the center wavelengths of Carrier #1, Carrier #2 and Carrier #3, respectively. The laser generators 716, 717 and 718 may generate general wavelength variable lasers. The lasers generated by the laser generators 716, 717 and 718 are input to the optical hybrid units 713, 714 and 715, respectively.

The optical hybrid units 713, 714 and 715 multiply the input optical signals by the input lasers, and generate inphase signals and quadrature signals. As described above, the lasers generated by the laser generators 716, 717 and 718 correspond to Carrier #1, Carrier #2 and Carrier #3, respectively, and as the lasers are input to the optical hybrid units 713, 714 and 715, respectively, Optical signal #1, Optical signal #2 and Optical signal #3 output from the optical hybrid units 713, 714 and 715 becomes signals corresponding to Carrier #1, Carrier #2 and Carrier #3, respectively. Thus, the optical signals output from the optical hybrid units 713, 714 and 715 correspond to signals obtained by separating input optical signals for the optical carriers.

In the present exemplary embodiment, input optical signals can be separated for the optical carriers whose center frequencies and frequency intervals are variable, by adjusting the output wavelengths of the laser generators 716, 717 and 718. The laser generators 716, 717 and 718 can adjust output wavelengths in response to a control signal from the controller 720.

Although the laser generators 716, 717 and 718 and the optical hybrid units 713, 714 and 715 are included in the signals separator 710 in the present exemplary embodiment, the optical hybrid units 713, 714 and 715 may be included in the demodulators 731, 732 and 733, respectively. The laser generators 716, 717 and 718 and the optical hybrid units 713, 714 and 715 may be included in the demodulators 731, 732, and 733, respectively.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An optical signal transmitting apparatus comprising:
   an optical carrier generator configured to generate a plurality of optical carriers and outputs the optical carriers to optical modulators corresponding to the optical carriers, respectively;
   a plurality of optical modulators configured to modulate the optical carriers, respectively, according to an input signal; and
   an optical combiner configured to couple a plurality of optical signals from the plurality of optical modulators,
   wherein the optical carrier generator includes a laser generator configured to generate a laser and a modulator configured to modulate the laser to a sine wave,
   wherein the optical carrier generator adjusts a wavelength of the laser and a frequency of the sine wave to vary the center frequencies and frequency intervals of the plurality of optical carriers.

2. The optical signal transmitting apparatus of claim 1, wherein center frequencies and frequency intervals of the plurality of optical carriers are variable.

3. The optical signal transmitting apparatus of claim 2, wherein the optical carrier generator includes:
   a multicarrier generator configured to generate the plurality of optical carriers; and a carrier separator configured to separate the plurality of optical carriers and outputs the optical carriers to the optical modulators corresponding to the optical carriers, respectively.

4. The optical signal transmitting apparatus of claim 2, wherein the optical carrier generator further includes:
a plurality of laser generators configured to generate a plurality of lasers corresponding to the plurality of optical carriers, respectively.

5. The optical signal transmitting apparatus of claim 4, wherein the optical carrier generator adjusts wavelengths of the plurality of lasers, respectively, to vary the center frequencies and frequency intervals of the plurality of optical carriers.

6. The optical signal transmitting apparatus of claim 2, wherein the frequency intervals of the plurality of optical carriers are integer times as large as 50 GHz or integer times as large as 12.5 GHz.

7. The optical signal transmitting apparatus of claim 2, further comprising:
a controller configured to set center frequencies and frequency intervals of the plurality of optical carriers.

* * * * *